INVENTORS
Henning A. Brüniche - Olsen,
James C. Wright, Frank B. Price,
Clarence R. Steele, Harold F. Silver
BY

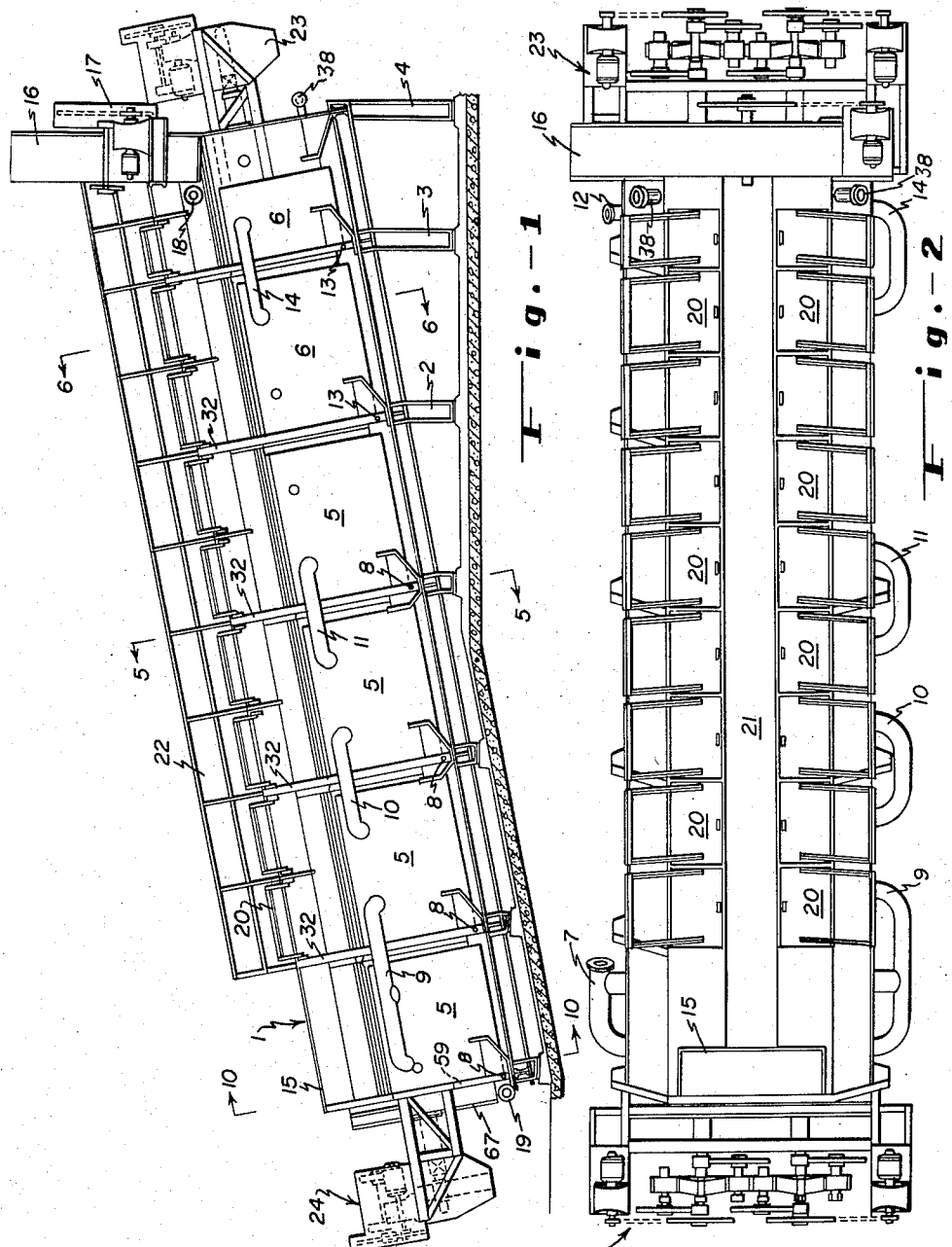

ATTORNEYS

INVENTORS
Henning A. Brüniche-Olsen,
James C. Wright, Frank B. Price,
Clarence R. Steele, Harold F. Silver
BY
ATTORNEYS May 5, 1959     H. A. BRÜNICHE-OLSEN ET AL     2,885,311

CONTINUOUS DIFFUSER

Filed Jan. 9, 1957     7 Sheets-Sheet 4

*Fig. 7*

INVENTORS
Henning A. Brüniche - Olsen,
James C. Wright, Frank B. Price,
Clarence R. Steele, Harold F. Silver
BY

ATTORNEYS

May 5, 1959 H. A. BRÜNICHE-OLSEN ET AL 2,885,311
CONTINUOUS DIFFUSER
Filed Jan. 9, 1957 7 Sheets-Sheet 5

INVENTORS
Henning A. Brüniche – Olsen,
James C. Wright, Frank B. Price,
Clarence R. Steele, Harold F. Silver
BY

ATTORNEYS

May 5, 1959  H. A. BRÜNICHE-OLSEN ET AL  2,885,311
CONTINUOUS DIFFUSER

Filed Jan. 9, 1957  7 Sheets-Sheet 6

INVENTORS
Henning A. Brüniche - Olsen,
James C. Wright, Frank B. Price,
Clarence R. Steele, Harold F. Silver
BY
*Edwards*
ATTORNEYS INVENTORS
Henning A. Brüniche - Olsen,
James C. Wright, Frank B. Price,
Clarence R. Steele, Harold F. Silver
BY

ATTORNEYS

United States Patent Office 2,885,311
Patented May 5, 1959

2,885,311

CONTINUOUS DIFFUSER

Henning A. Bruniche-Olsen, Gentofte, Denmark, and James C. Wright, Denver, Frank B. Price, Englewood, and Clarence R. Steele and Harold F. Silver, Denver, Colo.; said Bruniche-Olsen assignor to Aktieselskabet de Danske Sukkerfabrikker, Copenhagen, Denmark, a corporation of Denmark; said Wright, said Price, said Steele, and said Silver assignors to Silver Corporation, Denver, Colo., a corporation of Colorado Application January 9, 1957, Serial No. 633,204

17 Claims. (Cl. 127—45)

This invention relates to a process and apparatus for the continuous lixiviation of divided solid material and has particular application but is not limited to a process and apparatus for the extraction of the sugar content of shredded sugar beets, commonly known as cossettes, by continuous diffusion.

According to the present invention, we provide a countercurrent treatment zone for continuous diffusion with the solvent liquid or hot water introduced at one end to flow by gravity to its opposite end while cossettes introduced as feed at the liquid discharge end are moved progressively and in a controlled manner through a series of contiguous stages with sugar extraction at each stage, so that on reaching the cossette discharge end, sugar extraction is substantially complete, and the cossettes are discharged as spent pulp. The enriched solution is discharged at the opposite end as the factory raw juice.

It is a primary object of our invention to provide a simple, efficient, and economical process for continuous diffusion, utilizing high cell fill and adequate mixing to obtain greater sugar extraction in a given treatment time, as well as greater volumetric capacity.

Another object of this invention is to provide a control of cossette movement in a single pass continuous diffusion treatment utilizing a substantially constant velocity of axial movement of juice and pulp and applying to the pulp or cossettes a component of rotation arranged to impart limited angular movement in conjunction with the progressive advance so as to distribute the cossettes substantially uniformly throughout the fill of the cell or treatment zone.

A further object of the invention is to provide in a continuous countercurrent diffusion treatment an alternate movement of the cossettes in increments applied by direct application of force thereto followed by a displacement effect resulting from movement of other cossettes under direct application of force into an area occupied by the first-mentioned cossettes which are momentarily without direct application of motive forces.

Still another object of the invention is to provide simple, durable, and efficient apparatus for performing a complete diffusion treatment in a single compact structural unit.

Other objects reside in novel details of construction and novel combinations and arrangement of parts, all of which will be set forth in detail in the course of the following description.

The practice of our invention will be understood more readily by reference to the accompanying drawings. In the drawings, in the several views of which like parts have been designated similarly.

Fig. 1 is a side elevation of an apparatus embodying the novel features of our invention and shown in normal operating position;

Fig. 2 is a top plan view of the unit shown in Fig. 1;

Fig. 7 is a partial schematic side elevation of one of the helical flight conveyors of the unit shown in Fig. 1, illustrating the successive stages of treatment throughout the length of the flight assembly;

Figure 3:
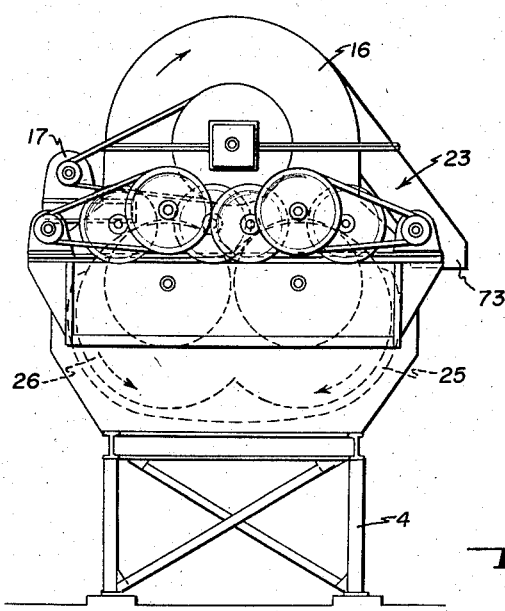
Fig. 3 is an elevation showing the solids discharge end of the apparatus shown in Fig. 1.

As shown in Fig. 1, the diffusion apparatus of our invention comprises a tank or cell 1, mounted at an inclination to the horizontal at a slight angle on a plurality of supports, 2, 3, 4 etc. and along its lower portion the tank is covered by steam jackets 5 while similar steam jackets 6 cover the upper portion of the tank. Jackets 5 extend in continuous arrangement around the lower end of the tank and include internal partitions (not shown) which direct the steam through a circuitous route within the enclosure. Steam is introduced into the lower jackets 5 through an inlet 7 (Fig. 2), and a plurality of condensate outlets 8 release the condensed steam. Pipes 9, 10, and 11 interconnect the adjoining sections of jackets 5. Upper jacket 6 has an inlet 12 (Fig. 2) and a series of outlets 13 for release of condensate. It also is divided by internal partitions (not shown) and a pipe 14 interconnects the two sections of the jacket. Non-condensable gas from the heating jackets is discharged through vent 38, Fig. 1.

Cossettes are introduced through a feed inlet 15 in the top surface of the tank at its lower end, and are discharged as spent pulp by a bucket wheel 16 operated by the drive mechanism 17. The solvent or hot water is introduced through a plurality of inlets 18 at the upper end of the tank, and the enriched solution is withdrawn through a lower discharge outlet 19. Access to the interior of tank 1 is provided by a series of doors 20 adjacent a catwalk 21, and handrails 22 are provided for the catwalk.

Figure 5:
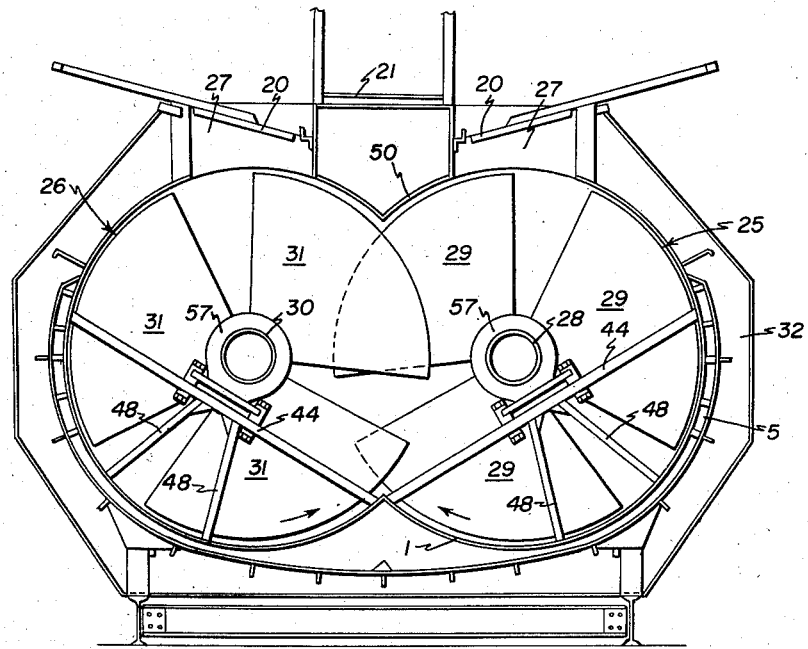
Fig. 5 is a cross section taken along the lines 5—5, Fig. 1, and drawn to an enlarged scale to illustrate the arrangement of dual helical flight conveyors with coacting breaker bars at the location of the bearings supporting the flight conveyors.
Figure 6:
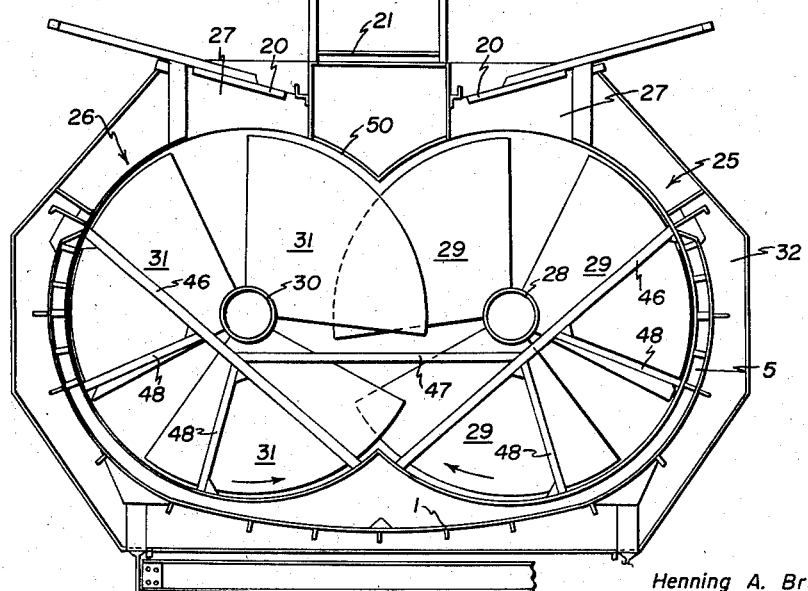
Fig. 6 is a cross section taken along the line 6—6, Fig. 1, and drawn to an enlarged scale to illustrate the breaker bar arrangement at all other locations in the apparatus.

Preferably, tank 1 conforms in cross section to the peripheral outline of the conveyor mechanism as shown in Figs. 5 and 6, and has in its upper portion one or a plurality of (here shown as two) channels 27 as vent passages for evolved gases and which also provide collection space in event of accidental flooding of the unit with excess solvent. A series of lateral braces 32 extend partially around the periphery of tank 1 and provide stabilizing support therefor.

Cossette movement within tank 1 from inlet 15 to discharge outlet 16 is provided by a dual conveyor unit having an upper drive 23 and a lower drive 24. The right conveyor unit 25 as viewed in Fig. 5 has a central shaft 28. A series of coacting helical flight sections 29 are spaced around the periphery of the shaft. The left conveyor 26 has a similar shaft 30 and similar flight sections 31, but with the helixes' opposite hand. These flight conveyors are arranged as helixes having three threads and are disposed in intermeshing relationship. The two conveyors rotate in opposite directions as indicated by the arrows in Figs. 5 and 6.

Figure 4:
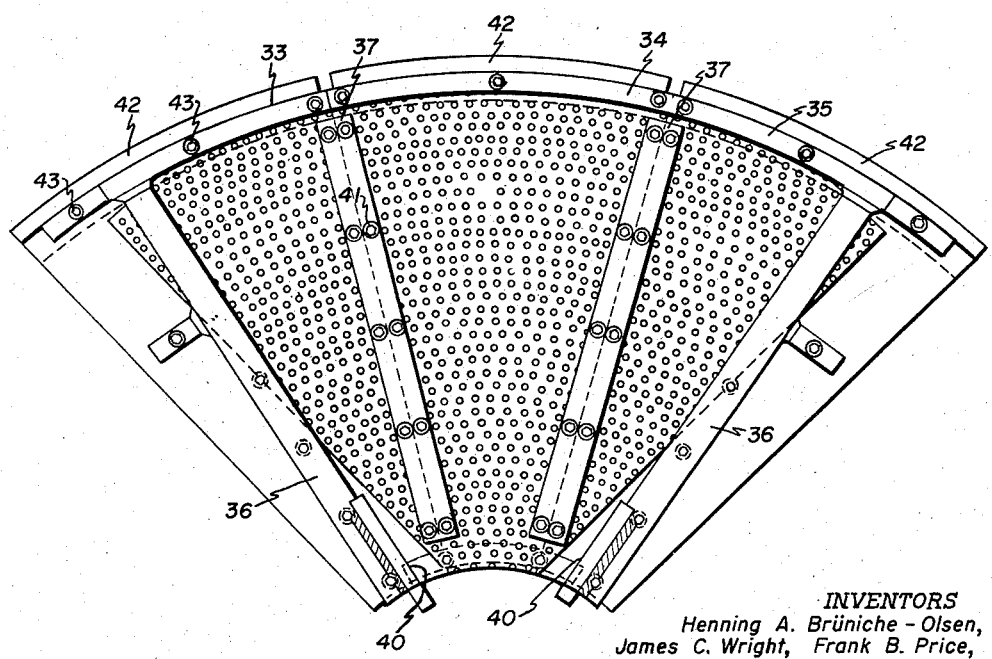
Fig. 4 is a plan view of a section or segment of the helical flight conveyor of the apparatus of Fig. 1, drawn to an enlarged scale.
Figure 8:
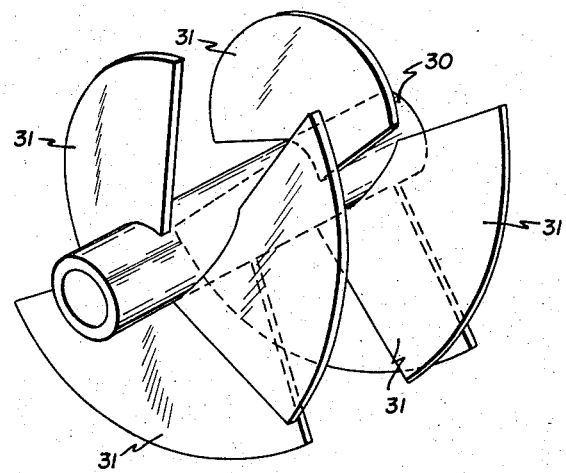
Fig. 8 is a fragmentary perspective view of a portion of the helical flight conveyor illustrating the relation of flight sections utilized in the progressive cossette movement.

The respective helixes are functional duplicates and detailed description of the construction of one will be ample to teach the practice of the invention. Referring to Figs. 4 and 8, a series of segmental sections 31 are mounted on shaft 30 in separated or discontinuous arrangement. Each section includes a series of perforated plate members 33, 34, and 35, supported by radial arms 36, and held together by radial bars 37. Radial arms 36 are given additional support on the shaft by gussets 40. Bolts 41 are provided to facilitate assembly, maintenance, and repair. Adjustable flanges 42 are held on the outer ends of the members 33, 34, and 35 by bolts 43 and are radially adjustable to provide close spacing of the periphery of the flight relative to the inner surface of the tank.

The helical flight conveyor of this invention has been designed to avoid excessive compacting or segregation of cossettes against conveyor surfaces during impelling movement and the discontinuous flight arrangement is an important factor in this control.

Figure 10:
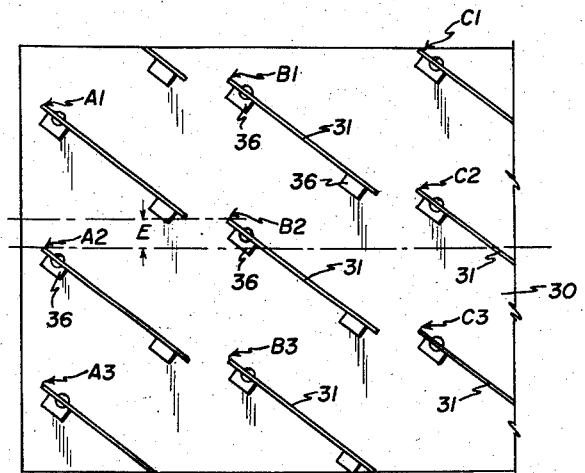
Fig. 10 is a developed section of a portion of the shaft of one of the helical flight conveyors illustrating the positioning of the flight sections along the length of the shaft.

Fig. 10 illustrates a development of the shaft 30 with the blade segments 31 mounted thereon in a preferred arrangement in staggered relation, and showing three stages of a three-threaded helical conveyor. As shown, the same point of each segment in each stage is spaced 120° from the next in series, that is, point $A^1$ is 120° from point $A^2$ and point $A^3$ is 120° from both points $A^2$ and $A^1$.

Figure 9:
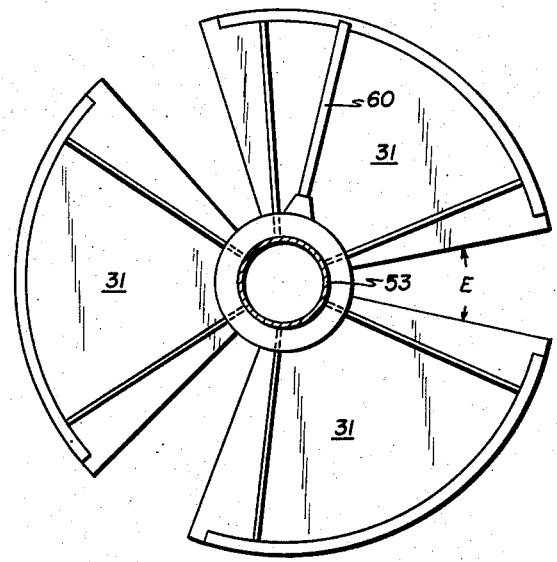
Fig. 9 is an end view of one of the helical flight conveyors illustrating the arrangement of flight sections and the juice screen scraper arm.

It will be noted that in the direction of rotation, the individual flights 31 cover considerably less than 120° around the shaft 30. In the arrangement shown in Figs. 8, 9, and 10, the angular coverage of each individual flight 31 is 96°. The successive stages of flights have their advancing edges $B^1$, $B^2$, etc. approximately in axial alignment with the trailing edge of the preceding flights. The helical conveyors may have one, two, three, or more threads, but in each case the peripheral arc of each individual flight 31 will be less than 360° divided by the number of threads.

This arrangement provides three distinct passages between the threads, but it will be noted that an extension of the passages from one stage to the next has an offset pattern. This placement of the helical flights combined with the use of breaker bars as shown has proved to give the most uniform cross section of cossettes within the conveyor passages. The arrangement of breaker bars is provided in the spaces between the conveyor sections to interrupt cossette accumulation and to control the flow so that diffusion progresses uniformly and under substantially optimum conditions through the range of cossette movement in the tank.

To this end, elongated breaker bars 44 and 46 are mounted on the inner surface of the tank in a biased position between successive series of flight sections and are interconnected with shorter breaker bars 48 positioned in substantially radial arrangement. Bars 44, 48, 48 provide support for shaft-bearing housings 57 as shown in Figs. 5 and 7. Similar elongated breaker bars 46 are disposed diagonally elsewhere in the tank and are interconnected with the shorter breaker bars 48, and laterally adjoining breaker bars 46 are interconnected by a horizontal cross bar 47 as shown in Fig. 6 to provide additional support and assist in cossette distribution. The series of bars 46, 47, 48 are provided in the space between each successive series of flight sections, except where bearing support is required and the first mentioned arrangement is utilized.

Fig. 7 is a schematic representation of a typical flight section and breaker bar distribution arrangement, which will assist in understanding of the cossette movement through the tank. The dash line portions 51 represent the region covered by a coacting set of helical flights in a single revolution of the shaft, and between each of the portions 51 a space 52 is provided which is outside the range of spiral contact. The breaker bar assemblies represented by the breaker bars 44 and 46 are disposed in such spaces and thus provide points of interruption to angular cossette movement in their advance through such spaces.

Where large capacity units of this design are to be used in single pass treatments, a divided shaft arrangement is employed. As shown in Fig. 7, a shaft section 53 has its inner end 54 abutting the inner end 55 of another shaft section 56. Under some treatment conditions, it will be advantageous to impart a faster rate of cossette movement at one end of the tank, and by using the split shaft arrangement with differential driving rates, a selective control of cossette movement is provided.

In order to obtain a discharge of enriched solution through outlet 19 without undue contamination by solids constituents, we provide a screen 59 mounted in the dash line position shown in Fig. 7; and a bar-type scraper 60 (Fig. 9) supported by a collar 61 for conjoint rotation on the end of shaft 53 wipes the screen surface during shaft rotation to prevent accumulation of solids which would impede direct passage of the solution through the screen.

Figure 12:
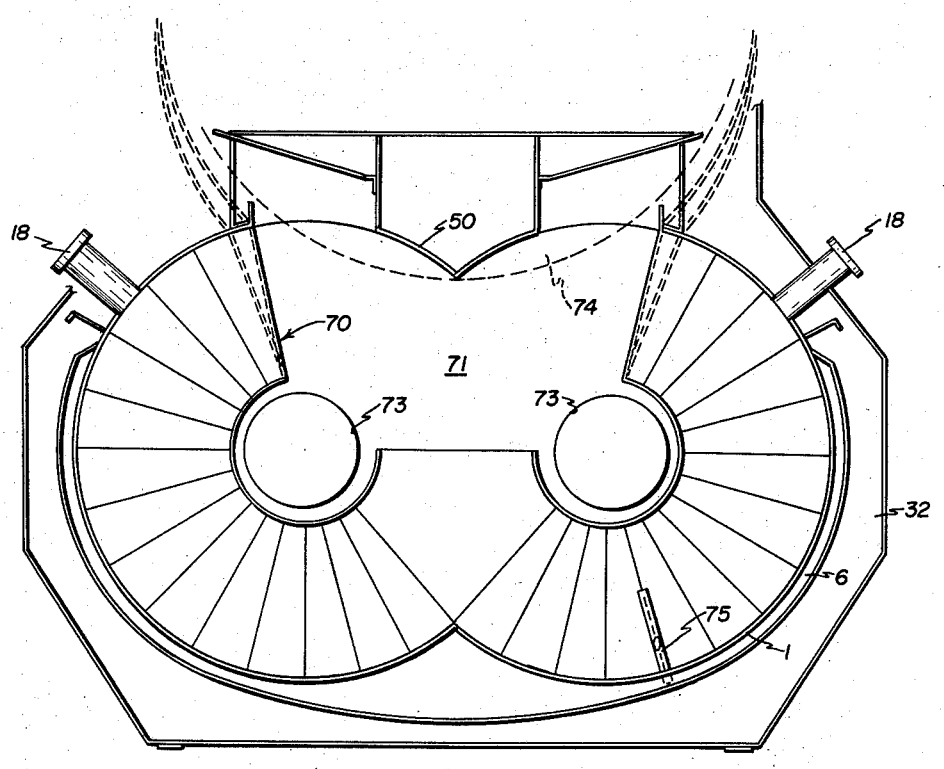
Fig. 12 is an end elevation of the shell of the pulp discharge end of the assembly shown in Fig. 1.
Figure 11:
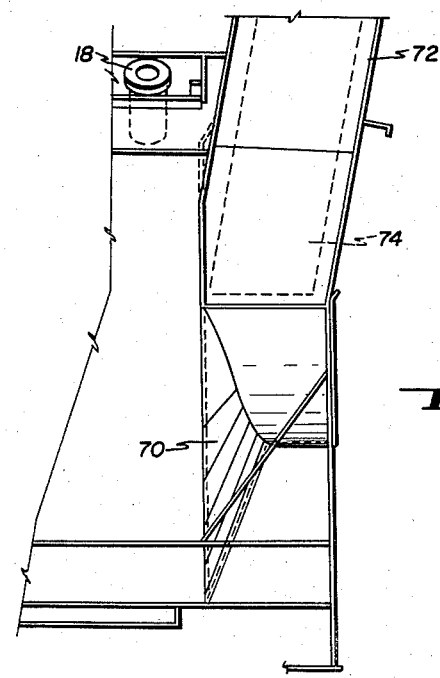
Fig. 11 is a fragmentary side elevation of the solids discharge end of the unit shown in Fig. 1.

The cossette discharge at the opposite end of the tank preferably utilizes a drainage action for juice retention within the tank. Therefore, we provide a deflector or guide plate 70 (Figs. 11 and 12) which faces the last set of flight sections of the conveyors and acts as a closure for the upper end of the tank. Spent cossettes are directed by plate 70 under the impelling influence of the conveyors into a restricted discharge portion 71 centrally of the upper end of the tank. The cossettes drain in this movement and then pass through the discharge housing 72 beyond the tank.

Figure 14:
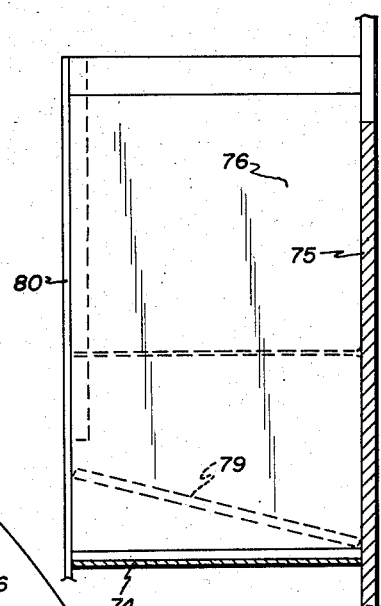
Fig. 14 is a side elevation of the pulp discharge assembly shown in Fig. 13.
Figure 13:
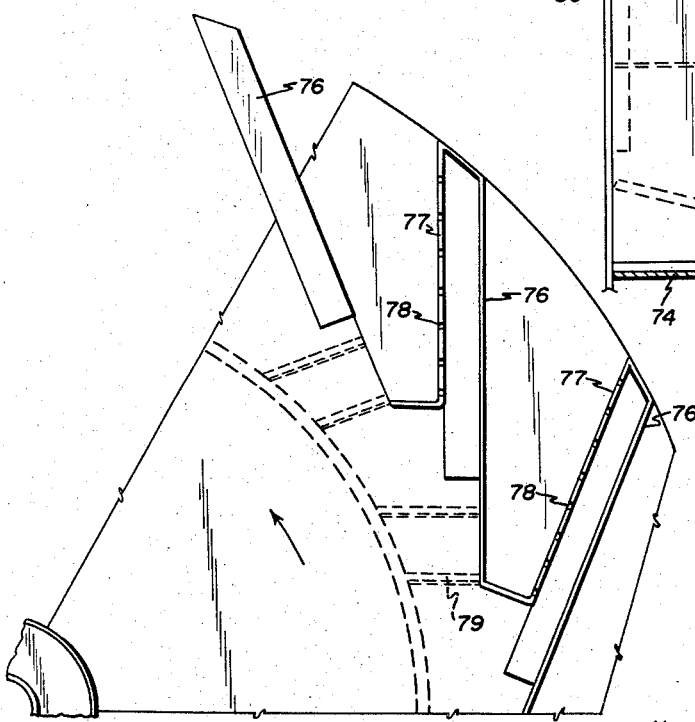
Fig. 13 is a fragmentary end elevation of the pulp discharge assembly of the unit shown in Fig. 1.

A bucket wheel 74 acts as the discharge means in this arrangement (Figs. 13 and 14) and includes an imperforate disc 75 mounted for rotation in housing 72. Tray members 76 are secured to and extend axially from disc 75 and are angularly disposed relative to the radius of the disc. Trays 76 are connected with perforated plates 77 having drainage openings 78, and a deflector member 79 directs the flow of drained liquid. When the wheel is rotated as indicated by the arrow in Fig. 13, solids are fed to and lifted on plate 77, with drainage occurring during the upward course of movement, and the drainage being guided by tray 76 along the deflection plate 79 finally passes back into the tank.

With this understanding of the construction of a unit such as shown in Fig. 1, a typical operation of such a unit in the diffusion stage of a beet sugar refining operation will be described. In this typical operation, steam is delivered into and circulated through the jackets 5 and 6 to maintain a desired temperature within the treatment zone, cossettes are fed continuously through inlet 15 and hot water is introduced through upper inlets 18 to maintain a desired fill within the tank. Under optimum conditions, a countercurrent system such as this would provide a continuous movement of cossettes at constant linear speed throughout the filled area of the tank in opposition to gravitational movement of liquid at constant linear speed throughout such area. With such a system, uniform concentrations would prevail at any selected distance along the length of the tank, and highly efficient diffusion would result.

However, the problem of mechanical movement of cossettes tends to cause density differentials at different stages of the treatment, and rate of percolation varies with density. When a simple screw conveyor is used, there is a tendency for the cossettes to concentrate on the uplifting side of the screw with consequent voids on the downward moving side. Under such conditions there will be large spaces unfilled with cossettes which act like channels to pass liquid at a faster rate than in the percolating areas, all to the disadvantage of diffusion.

Consequently, we have provided in our design, an arrangement that imparts rotational movement to the cossettes, with a planned series of interruptions to the rotational movement. By combining therewith a displacement action continuing the linear advance, we obtain the effect of substantially uniform distribution of cossettes throughout the liquid, and this results in an orderly, progressive flow of liquid in contact with the cossette surfaces and thereby maintains concentration balances required for proper diffusion.

In the passage of cossettes lengthwise of the tank, each section of the conveyor imparts to a cluster of cossettes an increment of movement, which is both linear and rotational, and derives from a direct application of force to such cossettes. There is movement of the helical surface relative to these contacted cossettes, which at the end of each cycle of revolution results in the cluster sliding out of contact with a given section. This would tend to create a static pulp condition, but the proximity of the following section pushing another cluster of cossettes provides another linear movement component by displacement, and this advances the first-mentioned cluster into the range of action of the next set of sections, which provides another direct application of force. These combined movements enable us to obtain an essentially constant speed linear movement of cossettes through the cell.

The arrangement of breaker bars distributed through the spaces between successive sets of flights provides interruptions in rotational movement of the cossette clusters in the spaces between successive sets of blades, and, with the displacement effect, serves to maintain a generally linear movement with proper balance of flows. Excessive density increases are avoided in this way and the juice is not subject to erratic percolation.

The arrangement of breaker bars and flight sections prevents bridging of compacted cossettes between flight sections. The angular offsetting of longitudinally adjacent flight sections helps prevent channeling of the juice. The confining surface 50, Figs. 5 and 6, between the helical conveyors prevents overflowing and by-passing of the mixture at this point and serves to increase the maximum level at which the diffusion apparatus will operate satisfactorily. As a result of this control, the diffusion action progresses in orderly manner. This has resulted in our achieving the greatest capacity in a given volume and the highest extraction in a given time in the history of sugar beet diffusion.

While the process and apparatus of our invention has been described with particular reference to sugar beet diffusion treatments, they will be effective with other materials such as sugar cane, for example. Changes and modifications may be availed of within the scope of the invention as defined in the hereunto appended claims.

We claim:

1. A continuous diffusion process, comprising a single treatment stage inclined at a slight angle to the horizontal and subject to continuous feed of liquid at one end, continuous feed of divided solids at its opposite end, and continuous discharge of spent pulp and enriched liquid at the respective ends of said stage opposite the points of their introduction, moving the solids upwardly along the inclination in a linear movement initiated by a succession of mechanical movements separately applied against any given portion of the solids with only a limited interval between such applications during which the movement of said solids continues from displacement by following solids responding to such mechanical movement and at a substantially uniform rate throughout the depth of the liquid body, moving the liquid downwardly along the inclination in a gravity flow countercurrent to the solids movement, imparting a rotational component of movement to said solids in said linear movement, and interrupting the rotation of said solids at intervals along the course of solids movement so as to distribute the solids uniformly throughout the liquid.

2. A process as defined in claim 1, in which the treatment stage has an unconfined, free surface throughout its length.

3. A continuous diffusion process, comprising a single treatment stage inclined to the horizontal and subject to continuous feed of liquid at one end, continuous feed of divided solids at its opposite end, and continuous discharge of spent pulp and enriched liquid at the respective ends of said stage opposite the points of their introduction, moving the solids upwardly along the inclination in a linear movement at a substantially uniform rate throughout the depth of the liquid body in a movement initiated by a succession of mechanical movements separately applied against any given portion of the solids with only a limited interval between such applications during which the movement of said solids continues from displacement of following solids responding to such mechanical movement, moving the liquid downwardly along the inclination in a gravity flow countercurrent to the solids movement, imparting a rotational component of movement to said solids in said linear movement, and interrupting the rotation of said solids at intervals along the course of solids movement so as to distribute the solids uniformly throughout the liquid.

4. A continuous diffusion process, comprising a single treatment stage inclined at a slight angle to the horizontal and subject to continuous feed of liquid at one end, continuous feed of divided solids at its opposite end, and continuous discharge of spent pulp and enriched liquid at the respective ends of said stage opposite the points of their introduction, moving the solids upwardly along the inclination in a linear movement at a substantially uniform rate throughout the depth of the liquid body in alternate increments of movement, one of which is initiated by a mechanical movement applied directly to a portion of the solid material, followed by another increment in which a portion of the solid material is moved by displacement by a portion of solids under mechanical movement, moving the liquid downwardly along the inclination in a gravity flow countercurrent to the solids movement, imparting a rotational component of movement to said solids in said linear movement, and interrupting the rotation of said solids at intervals along the course of solids movement so as to distribute the solids uniformly throughout the liquid.

5. A continuous diffusion process, comprising a single treatment stage inclined at a slight angle to the horizontal and subject to continuous feed of liquid at one end, continuous feed of divided solids at its opposite end, and continuous discharge of spent pulp and enriched liquid at the respective ends of said stage opposite the points of their introduction, moving the solids upwardly along the inclination in a linear movement at a substantially uniform rate throughout the depth of the liquid body in a movement initiated by a succession of mechanical movements separately applied against any given portion of the solids with only a limited interval between such applications during which the movement of said solids continues from displacement by following solids responding to such mechanical movement, moving the liquid downwardly along the inclination in a gravity flow countercurrent to the solids movement, imparting a rotational component of movement to said solids in said linear movement, and interrupting the rotation of said solids in each cycle of revolution at intervals along the course of solids movement so as to distribute the solids uniformly throughout the liquid.

6. In continuous diffusion apparatus, inclusive of a tank inclined at a slight angle to the horizontal for pulp having a solids feed inlet and a discharge outlet for enriched solution at its lower end and a solvent feed inlet and a discharge outlet for spent pulp at its upper end, the improvement which comprises at least one helical flight conveyor arranged to move solids from said lower feed inlet to said upper discharge outlet, the helical conveyor having a plurality of sets of circumferentially spaced separated flight sections with axial spacing between adjoining sets of sections so as to provide alternate surfaces of pulp contact and adjoining spaces lengthwise of the conveyor, each said section being perforated to pass solvent and hold the solids on its upstream face, and means for rotating said conveyor during said solids movement.

7. In continuous diffusion apparatus, inclusive of a tank inclined at a slight angle to the horizontal for pulp having a solids feed inlet and a discharge outlet for enriched solution at its lower end and a solvent feed inlet and a discharge outlet for spent pulp at its upper end, the improvement which comprises at least one helical flight conveyor arranged to move solids from said lower feed inlet to said upper discharge outlet, the helical conveyor having a plurality of sets of circumferentially spaced separated flight sections with axial spacing between adjoining sets of sections so as to provide alternate surfaces of pulp contact and adjoining spaces lengthwise of the conveyor, means for interrupting rotational movement of pulp between adjoining sets of sections, each said section being perforated to pass solvent and hold the solids on its upstream face, and means for rotating said conveyor during said solids movement.

8. In continuous diffusion apparatus, inclusive of a tank inclined at a slight angle to the horizontal for pulp having a solids feed inlet and a discharge outlet for enriched solution at its lower end and a solvent feed inlet and a discharge outlet for spent pulp at its upper end, the improvement which comprises at least one helical flight conveyor arranged to move solids from said lower feed inlet to said upper discharge outlet, the helical conveyor having a plurality of sets of circumferentially spaced separated flight sections with axial spacing between adjoining sets of sections so as to provide alternate surfaces of pulp contact and adjoining spaces lengthwise of the conveyor, and breaker bars disposed in the tank between adjoining sets of said sections so as to interrupt rotational movement of pulp in each cycle of revolution of the conveyor, each said section being perforated to pass solvent and hold the solids on its upstream face, and means for rotating said conveyor during said solids movement.

9. In continuous diffusion apparatus, inclusive of a tank inclined at a slight angle to the horizontal for pulp having a solids feed inlet and a discharge outlet for enriched solution at its lower end and a solvent feed inlet and a discharge outlet for spent pulp at its upper end, the improvement which comprises at least one helical flight conveyor arranged to move solids from said lower feed inlet to said upper discharge outlet, the helical conveyor having a plurality of sets of circumferentially spaced separated flight sections with axial spacing between adjoining sets of sections so as to provide alternate surfaces of pulp contact and adjoining spaces lengthwise of the conveyor, and submerged breaker bars disposed in the tank between adjoining sets of said sections so as to interrupt rotational movement of pulp in each cycle of revolution of the conveyor, each said section being perforated to pass solvent and hold the solids on its upstream face, and means for rotating said conveyor during said solids movement.

10. In continuous diffusion apparatus, inclusive of a tank inclined at a slight angle to the horizontal for pulp having a solids feed inlet and a discharge outlet for enriched solution at its lower end and a solvent feed inlet and a discharge outlet for spent pulp at its upper end, the improvement which comprises a plurality of helical flight conveyors arranged to move solids from said lower feed inlet to said upper discharge outlet, the helical conveyors having a plurality of sets of circumferentially spaced separated flight sections arranged in multiple thread formation with axial spacing between adjoining sets of sections so as to provide alternate surfaces of pulp contact and adjoining spaces lengthwise of the conveyors, and means for rotating said conveyors during said solids movement.

11. Apparatus as defined in claim 10, in which the helical flights have a peripheral arc of less than 360° divided by the number of threads described by said flights.

12. Apparatus as defined in claim 10, in which breaker bars are disposed in the tank between adjoining sets of sections so as to interrupt rotational movement of pulp therebetween.

13. In continuous diffusion apparatus, inclusive of a tank inclined at a slight angle to the horizontal for pulp having a solids feed inlet and a discharge outlet for enriched solution at its lower end and a solvent feed inlet and a discharge outlet for spent pulp at its upper end, the improvement which comprises a plurality of intermeshing helical flight conveyors arranged to move solids from said lower feed inlet to said upper discharge outlet, the helical conveyors having a plurality of sets of circumferentially spaced separated flight sections arranged in multiple thread formation with axial spacing between adjoining sets of sections so as to provide alternate surfaces of pulp contact and adjoining spaces lengthwise of the conveyors, said helical flights having a peripheral arc of less than 360° divided by the number of threads described by said flights, and means for rotating said conveyors during said solids movement.

14. In continuous dififfusion appaartus, inclusive of a tank inclined at a slight angle to the horizontal for pulp having a solids feed inlet and a discharge outlet for enriched solution at its lower end and a solvent feed inlet and a discharge outlet for spent pulp at its upper end, the improvement which comprises a plurality of helical flight conveyors arranged to move solids from said lower feed inlet to said upper discharge outlet, the helical conveyor having a plurality of sets of circumferentially spaced separated flight sections arranged in multiple thread formation with axial spacing between adjoining sets of sections so as to provide alternate surfaces of pulp contact and adjoining spaces lengthwise of the conveyors, said helical flights having a peripheral arc of less than 360° divided by the number of threads described by said flights and more than 360° divided by twice the number of threads described by said flights, and means for rotating said conveyors during said solids movement.

15. Apparatus as defined in claim 14, in which breaker bars are disposed in the tank between adjoining sets of sections so as to interrupt rotational movement of pulp therebetween.

16. In continuous diffusion apparatus, inclusive of a tank for pulp inclined at a slight angle to the horizontal and having a solids feed inlet and a discharge outlet for enriched solution at its lower end and a solvent feed inlet and a discharge outlet for spent pulp at its upper end, the improvement which comprises at least one helical flight conveyor arranged to move solids from said lower feed inlet to said upper discharge outlet, the helical conveyor having a plurality of sets of circumferentially spaced separated flight sections with axial spacing between adjoining sets of sections so as to provide alternate surfaces of pulp contact and adjoining spaces lengthwise of the conveyor, each said section being perforate to pass solvent and hold the solids on its upstream face, the tank being closely spaced circumferentially of the helical conveyor and including a cover closely spaced circumferentially to the top of the helical conveyor, and means for rotating said conveyor during said solids movement.

17. In continuous diffusion apparatus, inclusive of a tank for pulp inclined at a slight angle to the horizontal and having a solids feed inlet and a discharge outlet for enriched solution at its lower end and a solvent feed inlet and a discharge outlet for spent pulp at its upper end, the improvement which comprises a plurality of intermeshed helical flight conveyors arranged to move solids from said lower feed inlet to said upper discharge outlet, each helical conveyor having a plurality of sets of circumferentially spaced separated flight sections with axial spacing between adjoining sets of sections so as to provide alternate surfaces of pulp contact and adjoining spaces lengthwise of the conveyors, each said section being perforate to pass solvent and hold the solids on its upstream face, the tank being closely spaced circumferentially of the helical conveyors and including a cover closely spaced to the top of the helical conveyors, and means for rotating said conveyors during solids movement.

References Cited in the file of this patent

UNITED STATES PATENTS 2,713,009     Bruniche-Olsen  ---------  July 12, 1955

FOREIGN PATENTS 1,090,851     France  ----------------  Oct. 20, 1954